(12) United States Patent
Xie et al.

(10) Patent No.: US 12,248,450 B1
(45) Date of Patent: Mar. 11, 2025

(54) VECTOR DATASET INDEX PARAMETER DETERMINATION

(71) Applicant: ZILLIZ INC., Redwood City, CA (US)

(72) Inventors: Chao Xie, Redwood City, CA (US); Chao Gao, Redwood City, CA (US); Li Liu, Redwood City, CA (US); Min Tian, Redwood City, CA (US)

(73) Assignee: ZILLIZ INC., Redwood City, CA (US)

( * ) Notice: Subject to any disclaimer, the term of this patent is extended or adjusted under 35 U.S.C. 154(b) by 0 days.

(21) Appl. No.: 18/426,499

(22) Filed: Jan. 30, 2024

(51) Int. Cl.
  *G06F 16/22* (2019.01)
  *G06F 16/242* (2019.01)
  *G06F 16/248* (2019.01)

(52) U.S. Cl.
  CPC ........ *G06F 16/2237* (2019.01); *G06F 16/244* (2019.01); *G06F 16/248* (2019.01)

(58) Field of Classification Search
  CPC ... G06F 16/2237; G06F 16/244; G06F 16/248
  See application file for complete search history.

(56) References Cited

U.S. PATENT DOCUMENTS

| | | | | |
|---|---|---|---|---|
| 10,977,251 | B1* | 4/2021 | Gibas | G06F 16/282 |
| 2011/0270871 | A1* | 11/2011 | He | G06F 16/24556 |
| | | | | 707/769 |
| 2015/0213463 | A1* | 7/2015 | Turner | G06F 16/2455 |
| | | | | 705/7.29 |
| 2022/0366440 | A1* | 11/2022 | Shinde | G06Q 30/0204 |
| 2023/0139988 | A1* | 5/2023 | Ma | G06F 16/221 |
| | | | | 707/705 |

OTHER PUBLICATIONS

Sun, L., Bao, J., Chen, Y. et al. Research on parameter selection method for support vector machines. Appl Intell 48, 331-342 (2018). (Year: 2017).*

* cited by examiner

*Primary Examiner* — Kris E MacKes
(74) *Attorney, Agent, or Firm* — HAUPTMAN HAM, LLP

(57) ABSTRACT

Vector dataset index parameter determination is performed by building an index of a vector dataset according to each build parameter group among a plurality of build parameter groups, generating search parameter groups, submitting each vector query in a vector query set to each index to obtain, for each vector query, a result content and a result delay value, wherein an accuracy value is determined based on the result content, correlating build parameter values and search parameter values with accuracy values and result delay values, fixing build parameter values based on the correlating, and determining a mathematical relationship expressing a correlation of the search depth parameter values, the numbers of requested results, and the accuracy values obtained in response to vector queries submitted to the index having the fixed build parameter values.

20 Claims, 8 Drawing Sheets

VECTOR DATASET INDEX PARAMETER DETERMINATION

BACKGROUND

Approximate Nearest Neighbor Search (ANNS) of a vector database or a vector engine is used widely in information retrieval, machine learning, and data mining. These applications convert the data into feature vectors and store them in the database with ANNS indexes. The search target will be converted into a vector to search for similar vectors in the database. Using an ANNS index, results of a query of the vector database will be returned with decreased accuracy, but also decreased delay compared with non-indexed vector databases. Common ANNS algorithms include InVerted File (IVF), InVerted File Product Quantization (IVFPQ), Hierarchical Navigable Small World (HNSW), Disk Approximate Nearest Neighbor (DiskANN), etc.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
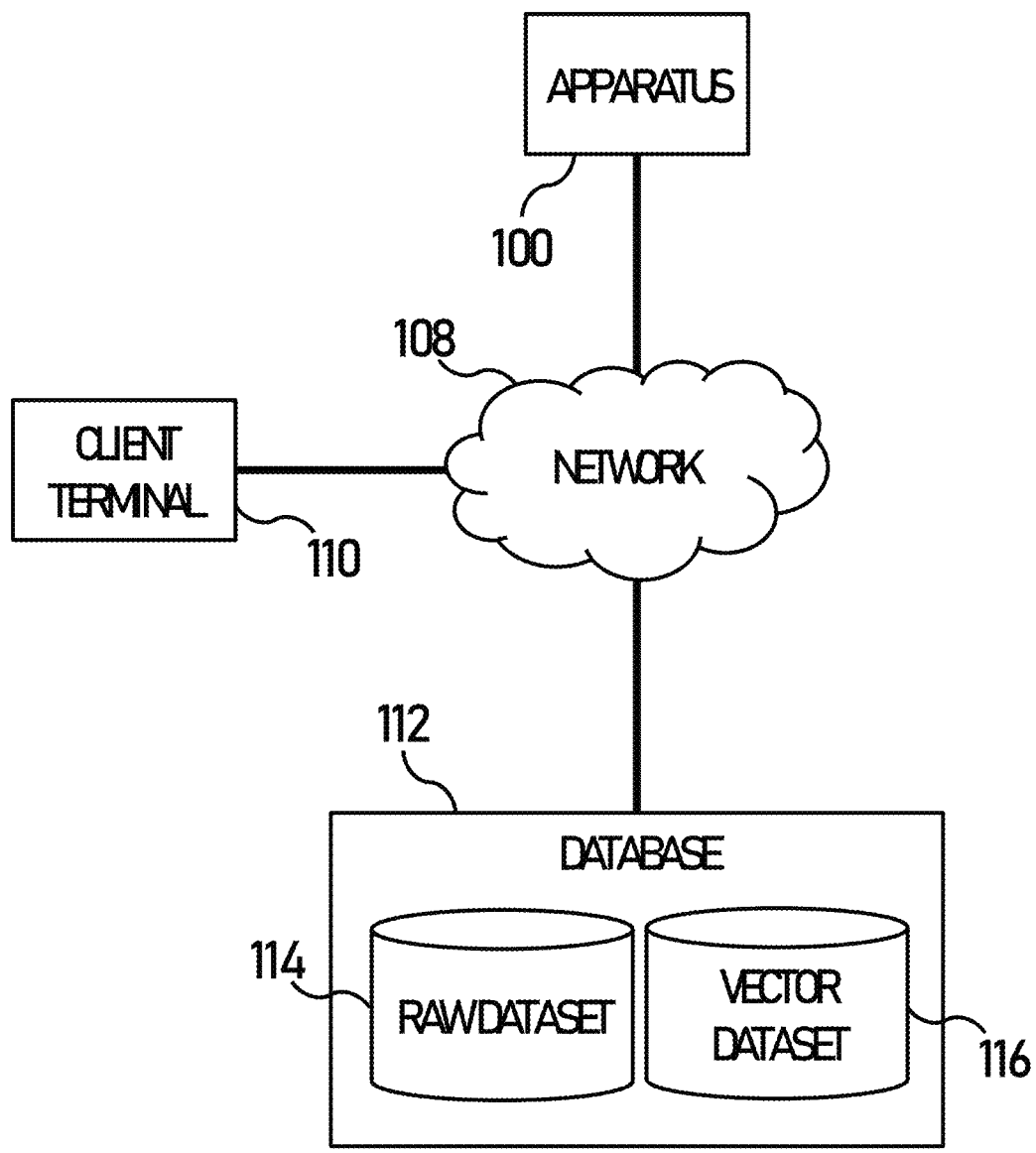
FIG. 1 is a block diagram of a system for vector dataset index parameter determination, according to at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Users use vector databases for vector similarity searches. They mainly concern with how to search with high precision (or high recall) with low response time in their scenarios, that is, how to trade off accuracy and response time. To meet their needs (high precision or low response time), users need to have the ANNS index background and pay a large amount of trial-and-error cost. On the one hand, they must understand all ANNS indexes in the vector database and the various parameters' roles in different indices. On the other hand, given the user's data attributes (dimension, data size, data distribution, etc.) and physical resources, they must pick the most suitable indexes and parameters, which usually means a bunch of tests. All of those are too hard for users.

At least some embodiments of the subject disclosure include an automatic tuning technique to reduce the usage difficulty. At least some embodiments include methods for automatically selecting a suitable index according to variable criteria, such as the user's needs, data attributes, physical resources, etc. At least some embodiments adapt parameters for each search request according to desired accuracy, number of results, delay, etc.

FIG. 1 is a block diagram of a system for vector dataset index parameter determination, according to at least some embodiments of the subject disclosure. The system includes an apparatus 100, a client terminal 110, and a database 112 in communication through a network 108.

In at least some embodiments, apparatus 100 is configured for vector dataset index parameter determination. In at least some embodiments, apparatus 100 includes a non-transitory computer-readable medium including instructions executable by a processor to cause the processor to perform vector dataset index parameter determination. In at least some embodiments, apparatus 100 is a single server, a plurality of servers, a portion of a server, a virtual instance of cloud computing, etc.

Database 112 includes a raw dataset 114 and a vector dataset 116. In at least some embodiments, a user may submit a query request by completing a query form provided in client terminal 110, and transmitting the query form to database 112 through network 108. In at least some embodiments, raw dataset 114 includes instances of the actual data desired in a query, such as instances of image data, instances of video data, instances of audio data, or instances of other data. In at least some embodiments, vector dataset 116 includes data that merely labels the raw data. In at least some embodiments, each vector among vector dataset 116 labels an instance of raw data among raw dataset 114.

In at least some embodiments, client terminal 110 includes a non-transitory computer-readable medium including instructions executable by a processor to cause the processor to submit queries to database 112. In at least some embodiments, client terminal 110 is a device having limited computation resources, such as a smart watch, a fitness tracker, an Internet-of-Things (IoT) device, etc., or a device having computational resources for a broader range of capabilities, such as a smart phone, a tablet, a personal computer, etc.

In at least some embodiments, network 108 is configured to relay communication among apparatus 100, client terminal 110, and database 112. In at least some embodiments, network 108 is a local area network (LAN), a wide area network (WAN), such as the internet, a radio access network (RAN), or any combination. In at least some embodiments, network 108 is a packet-switched network operating according to IPv4, IPv6 or other network protocol.

Figure 2:
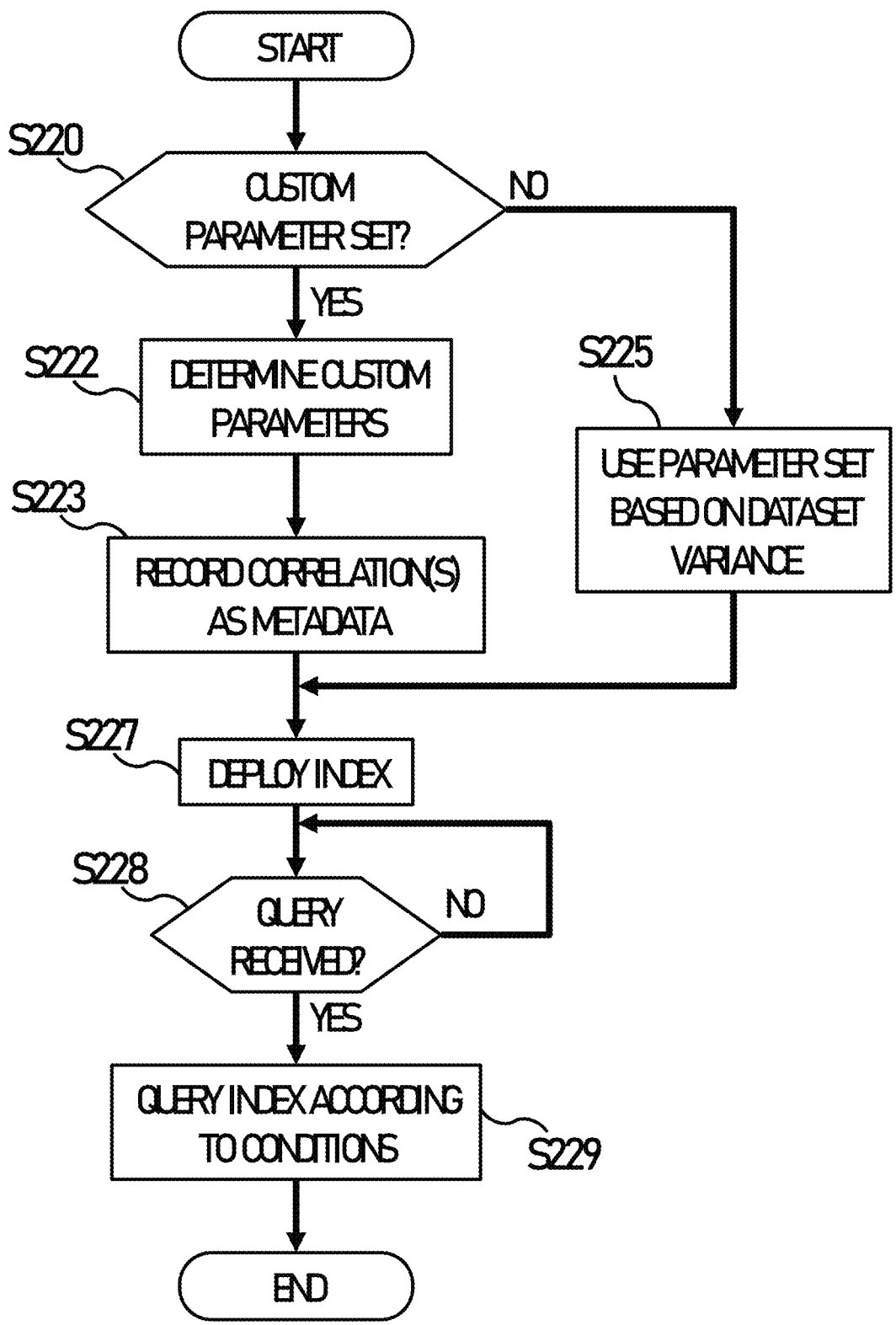
FIG. 2 is an operational flow for vector dataset index creation and utilization, according to at least some embodiments of the subject disclosure.

FIG. 2 is an operational flow for vector dataset index creation and utilization, according to at least some embodiments of the subject disclosure. The operational flow provides a method of vector dataset index creation and utilization. In at least some embodiments, one or more operations of the method are executed by a controller of an apparatus, such as the controller and apparatus shown in FIG. 8, which will be explained hereinafter.

At S220, the controller or a section thereof determines whether to provide a custom parameter set. In response to the controller determining to provide a custom parameter set, the operational flow proceeds to custom parameter determination at S222. In response to the controller determining not to provide a custom parameter set, the operational flow proceeds to parameter set usage at S225.

At S222, the controller or a section thereof determines custom parameters. In at least some embodiments, the controller determines custom parameters according to variable criteria, such as the user's needs, data attributes, physical resources, etc. In at least some embodiments, data attributes include dimension, data size, data distribution, number of vectors, etc. In at least some embodiments, the controller performs the operations shown in FIG. 3, which will be explained hereinafter.

At S223, the controller or a section thereof records correlation(s) as metadata. In at least some embodiments, a correlating section correlates build parameter values and search parameter values with accuracy values and result delay values. In at least some embodiments, the controller records a mathematical relationship expressing a correlation of search depth parameter, number of requested results, and accuracy as metadata for future queries of the database. In some embodiments, the mathematical relationship exists in the metadata information in the form of configuration. In at least some embodiments, the mathematical relationship is expressed as a mathematical formula. In at least some embodiments, the mathematical relationship is expressed as a look-up table.

At S225, the controller or a section thereof uses parameter set based on dataset variance. In at least some embodiments, the controller determines the build parameters according to the distribution of the vector dataset. In at least some embodiments, the controller determines the build parameters according to the local intrinsic dimension of the vector dataset, the local intrinsic dimension being a single value representative of the distribution of the vector dataset. In at least some embodiments, the controller uses the same build parameters for vector datasets with a similar distribution, and those build parameters allow the datasets to use similar search parameters to achieve similar accuracy. In at least some embodiments, the controller adjusts resource-related search parameters by the available physical resources of the database hosting the vector dataset, such as database 112 of FIG. 1, including a number of CPUs, a memory capacity, an I/O bandwidth, etc., and determines parameters based on number of requested results and accuracy level. In at least some embodiments, a dynamic adjustment method is adopted by the controller to match different numbers of requested results and accuracy levels.

At S227, the controller or a section thereof deploys the index for the vector dataset. In at least some embodiments, the controller deploys the index for the vector dataset built according to fixed build parameter values. In at least some embodiments, build parameter values are fixed as a result of custom parameter determination at S222 based on the build parameter values and search parameter values correlated with accuracy values and result delay values. In at least some embodiments, the controller deploys the index for the vector dataset built from parameters determined according to the distribution of the dataset at S225.

At S228, the controller or a section thereof determines whether a query is received. In at least some embodiments, the controller determines if the database receives a query from the client terminal. In response to the controller determining that a query is received, the operational flow proceeds to index querying at S229. In response to the controller determining that a query is not received, the operational flow repeats the process of determining if a query is received at S228.

At S229, the controller or a section thereof queries the index according to conditions. In at least some embodiments, the controller queries the index according to a desired accuracy level and number of results. In at least some embodiments, the controller reads a configuration file adapted to the vector dataset, and utilizes the configuration file to determine one or more search parameters for the query in response to receiving the query. In at least some embodiments, the controller performs the operations shown in FIG. 6, which will be explained hereinafter.

In at least some embodiments, index deploying at S227, query receiving at S228, and index querying at S229 are performed by the database hosting the index of the vector data set, such as database 112 of FIG. 1.

Figure 3:
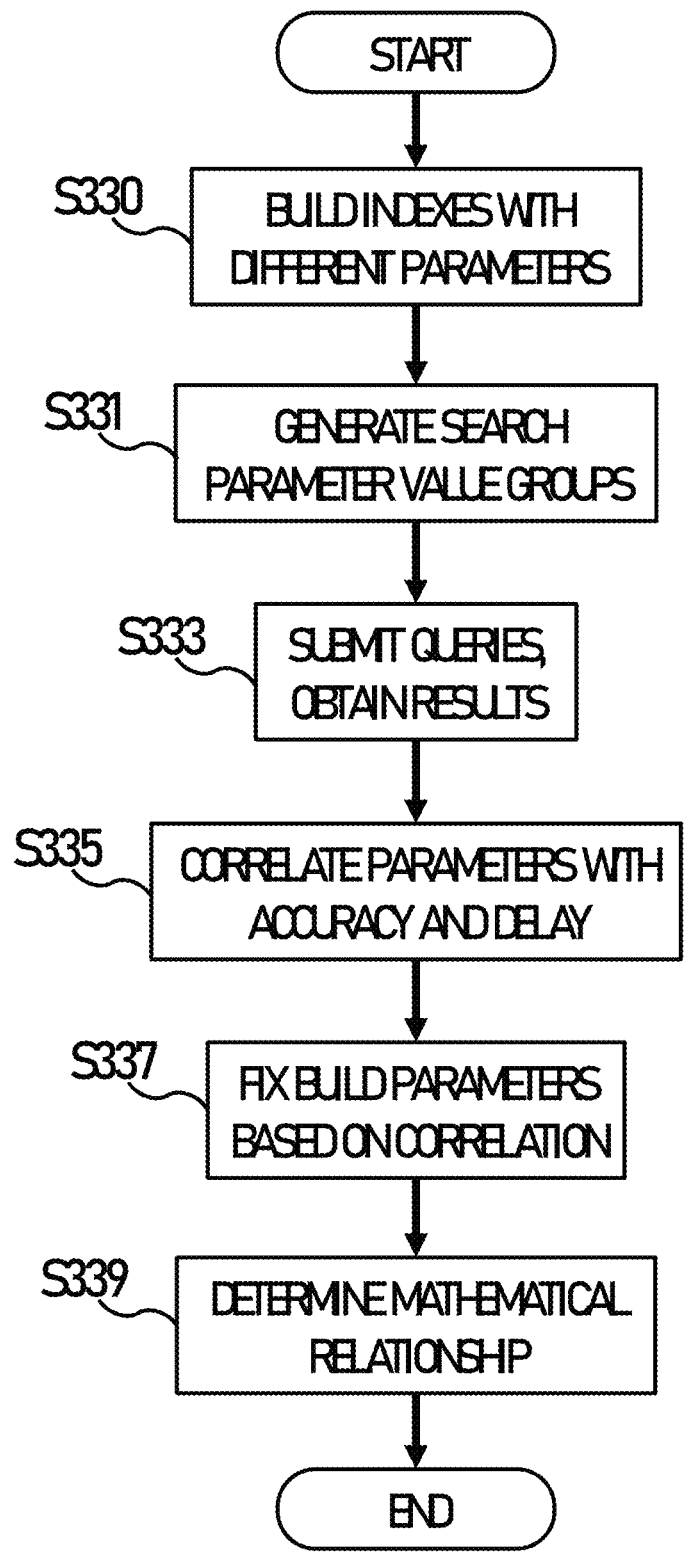
FIG. 3 is an operational flow for vector dataset index parameter determination, according to at least some embodiments of the subject disclosure.

FIG. 3 is an operational flow for vector dataset index parameter determination, according to at least some embodiments of the subject disclosure. The operational flow provides a method of vector dataset index parameter determination. In at least some embodiments, one or more operations of the method are executed by a controller of an apparatus, such as the controller and apparatus shown in FIG. 8, which will be explained hereinafter.

At S330, the index building section builds indexes with different parameters. In at least some embodiments, the index building section builds an index of a vector dataset according to each build parameter group among a plurality of build parameter groups, each build parameter group including a plurality of candidate build parameter values. In at least some embodiments, the index building section builds each index of the same type. In at least some embodiments, the index building section builds indexes of different types. In at least some embodiments, the index building section builds HNSW indexes, each having a different value for the "M" parameter. In at least some embodiments, the "M" parameter represents the upper bound of graph index nodes' out degree. In at least some embodiments, the index building section builds IVF indexes, each having a different value for the "nlist" parameter. In at least some embodiments, the controller or a section thereof determines the plurality of candidate build parameter values of each build parameter group based on an index type.

At S331, a generating section of the controller generates search parameter values. In at least some embodiments, the generating section generates search parameter groups, each search parameter group including a plurality of candidate search parameter values, wherein the plurality of candidate search parameter values includes a search depth parameter value and a number of requested results. In at least some embodiments, at least some search parameter groups relate to HNSW indexes, and the search depth parameter is the "ef_search" parameter. In at least some embodiments, at least some search parameter groups relate to IVF indexes, and the search depth parameter is the "nprobe" parameter. In at least some embodiments, the generating section generates an array of search depth parameter values sufficient to determine the relationship with accuracy level and number of requested results. In at least some embodiments, number of requested results is referred to as "topk" results, and accuracy is referred to as "recall".

At S333, the controller or a section thereof submits queries and obtains results. In at least some embodiments, the controller submits each vector query in a vector query set to each index according to the candidate search parameter values from each search parameter group to obtain, for each vector query, a result content and a result delay value, wherein an accuracy value is determined based on the result content. In at least some embodiments, each vector query includes search terms, search parameters, a desired number of search results, and a desired accuracy. In at least some embodiments, the controller performs the operations shown in FIG. 4, which will be explained hereinafter.

At S335, a correlating section of the controller correlates parameters with accuracy and delay. In at least some embodiments, the correlating section correlates build parameter values and search parameter values with accuracy values and result delay values. In at least some embodiments, build parameter values and search parameter values are correlated with delay values and accuracy values.

At S337, a fixing section of the controller fixes build parameters based on the correlation. In at least some embodiments, the fixing section fixes build parameter values based on the correlation of the build parameter values and search parameter values with the accuracy values and result delay values. In some embodiments, the build parameter values are fixed according to a balance between accuracy and delay.

At S339, a determining section of the controller determines a mathematical relationship. In at least some embodiments, the determining section determines a mathematical relationship expressing a correlation of the search depth parameter values, the numbers of requested results, and the accuracy values obtained in response to vector queries submitted to the index having the fixed build parameter values. In some embodiments, the mathematical relationship shows a relationship between search depth parameter, accuracy level, and number of requested results. In some embodiments, the mathematical relationship shows a relationship between search depth parameter and number of requested results for each of two or more accuracy levels. In at least some embodiments, the correlating section performs the operations shown in FIG. 5, which will be explained hereinafter.

Figure 4:
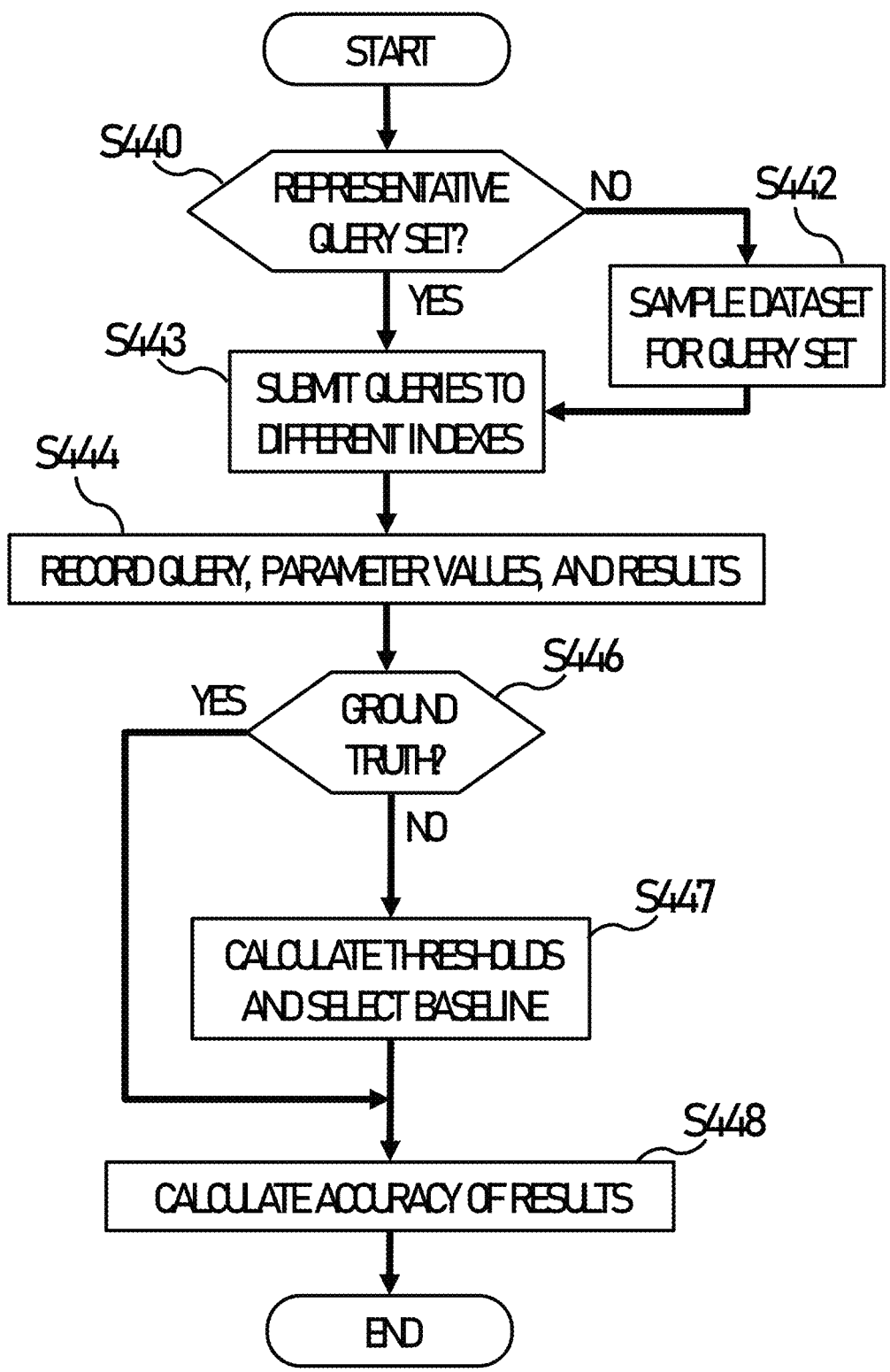
FIG. 4 is an operational flow for submitting queries and obtaining results, according to at least some embodiments of the subject disclosure.

FIG. 4 is an operational flow for submitting queries and obtaining results, according to at least some embodiments of the subject disclosure. The operational flow provides a method for submitting queries and obtaining results. In at least some embodiments, one or more operations of the method are executed by a controller of an apparatus, such as the controller and apparatus shown in FIG. 8, which will be explained hereinafter.

At S440, the determining section of the controller determines whether a representative query set is provided. In at least some embodiments, the index process is triggered automatically by the system or the user according to whether the provide a representative query is provided. In response to the controller determining that a representative query is provided, the operational flow proceeds to query submission at S442. In response to the controller determining that a representative query is not provided, the operational flow proceeds to dataset sampling at S443.

At S442, the generating section of the controller generates a sample dataset for a query set. In at least some embodiments, the generating section samples vectors among a vector dataset for use as the vector query set. In at least some embodiments, random vectors are selected from the vector dataset as the query set. In at least some embodiments, transformations are made to the randomly selected vectors so that the queries do not have an exact matching vector in the vector dataset.

At S443, the controller or a section thereof submits queries to different indexes. In at least some embodiments, the query performance of a representative query set in the real scenario, such as a representative query set provided by an administrator of the vector dataset, is more representative of the actual performance of the system service.

At S444, the controller or a section thereof records query, parameter values, and results. In at least some embodiments, the controller or the section thereof records, for each submission, the vector query and the search parameter values along with a result content and a result delay. In at least some embodiments, the controller records the information to local storage or remote storage.

At S446, the determining section of the controller determines if ground truth is provided. In at least some embodiments, the accuracy of the result in vector retrieval is calculated based on ground truth. In at least some embodiments, an unsupervised tuning method is used if no ground truth is provided. In response to the controller determining that ground truth is provided, the operational flow proceeds to accuracy calculation at S448. In response to the controller determining that ground truth is not provided, the operational flow proceeds to threshold calculation and baseline selection at S447.

At S447, the controller or a section thereof calculates thresholds and selects baseline. In at least some embodiments, an estimated ground truth is generated by calculating thresholds and selecting baseline. In at least some embodiments, an unsupervised tuning method is carried out, in response to no representative query being provided. In at least some embodiments, the controller submits queries under various search parameter values, and receives query results under the various search parameter values.

At S448, the controller or a section thereof calculates accuracy of results. In at least some embodiments, the controller determines the accuracy value based on ground truth. In at least some embodiments, the controller calculates accuracy for each query result based on the estimated ground truth. In at least some embodiments, the controller calculates the accuracy as a proportion of the number of results matching the ground truth or estimated ground truth.

Figure 5:
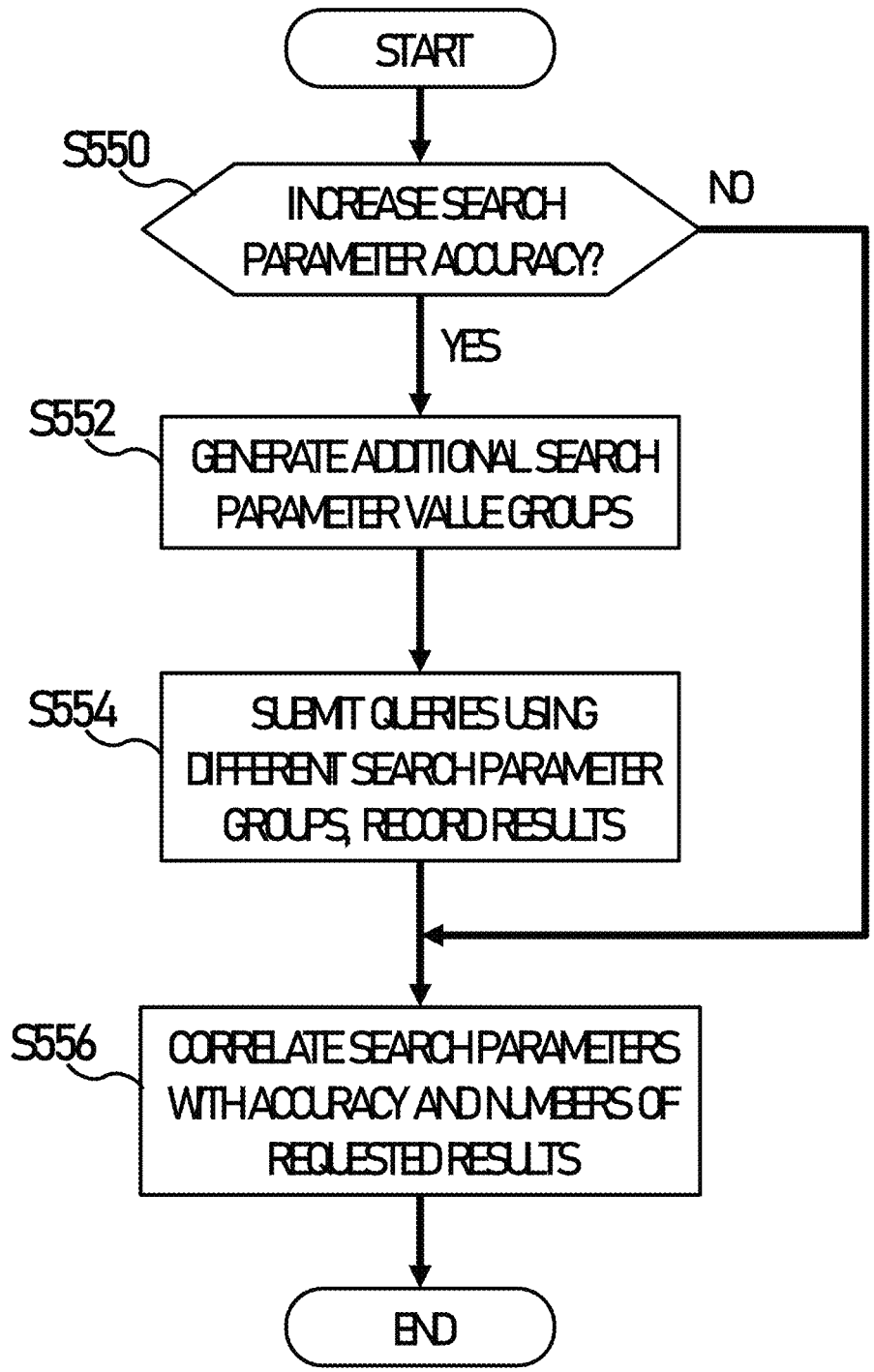
FIG. 5 is an operational flow for determining a mathematical relationship, according to at least some embodiments of the subject disclosure.

FIG. 5 is an operational flow for determining a mathematical relationship, according to at least some embodiments of the subject disclosure. The operational flow provides a method for determining a mathematical relationship. In at least some embodiments, one or more operations of the method are executed by determining section of a controller, such as the determining section shown in FIG. 8, which will be explained hereinafter.

At S550, the controller or a section thereof determines whether to increase the search parameter accuracy. In at least some embodiments, the controller or a section thereof submits queries under various search parameter values, and receives query results under the various search parameter values. In at least some embodiments, an increase of the search parameter accuracy is needed when an accuracy of the query results needs to be improved. In response to the controller determining to increase the search parameter accuracy, the operational flow proceeds to additional search parameter value group generation at S552. In response to the controller determining not to increase the search parameter accuracy, the operational flow proceeds to correlation at S556.

At S552, the generating section of the controller generates additional search parameter value groups, in response to increase search parameter accuracy is needed. In at least some embodiments, the generating section generates, after the fixing of the build parameter values, additional search parameter groups based on the fixed build parameter values. In at least some embodiments, each additional search parameter group includes a plurality of candidate search parameter values, wherein the plurality of candidate search parameter values includes a search depth parameter value and a number of requested results.

At S554, the controller or a section thereof submits queries using different search parameter groups, and the controller records the results. In at least some embodiments, a controller or a section thereof is configured to execute one or more operations of the method, such as operations shown in FIG. 4, which is explained hereinabove.

At S556, the correlating section of the controller correlates search parameters with accuracy and numbers of requested results. In at least some embodiments, the correlating section correlates search parameter values with accuracy values and numbers of requested results. In at least some embodiments, the correlating section correlates search parameter values with specified result size and accuracy value. In at least some embodiments, the correlating section tries various search parameter values in the query submissions at S554 so that the relevant search parameter values to the query request may be found. In at least some embodiments, the mathematical relationship shows a relationship between search depth parameter and number of requested results for each of two or more accuracy levels.

Figure 6:
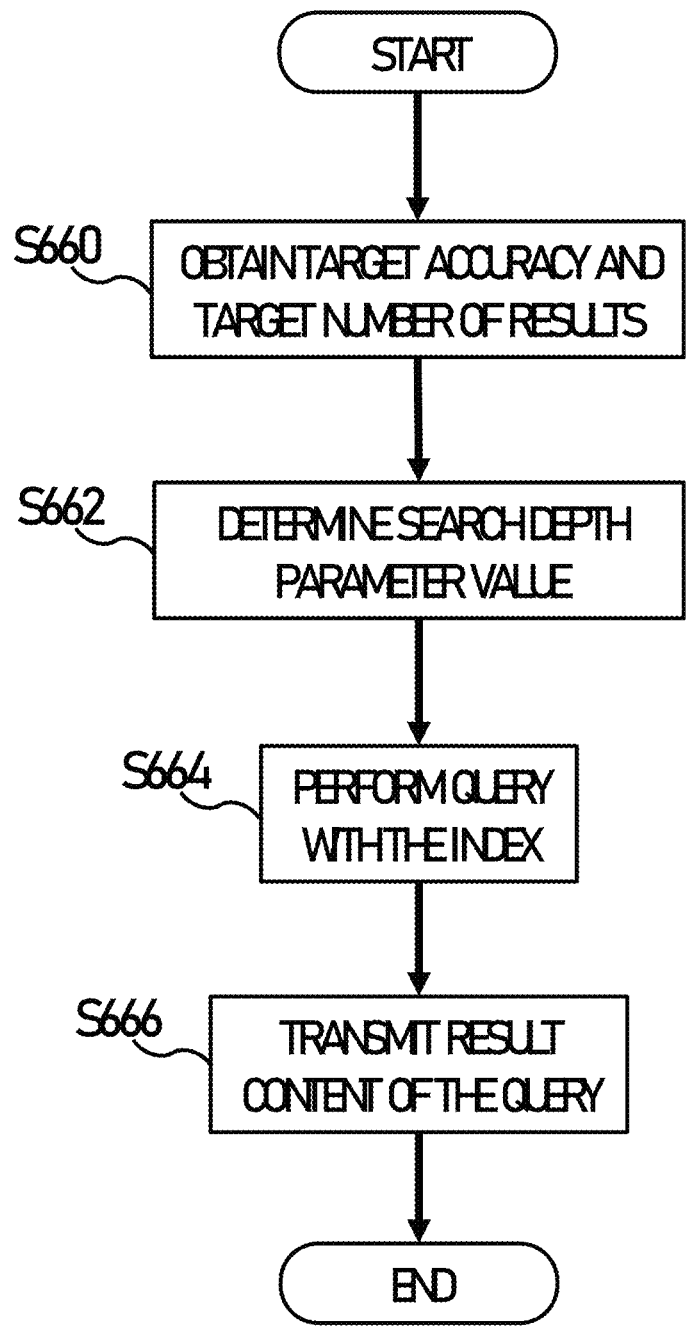
FIG. 6 is an operational flow for querying an index, according to at least some embodiments of the subject disclosure.

FIG. 6 is an operational flow for querying an index, according to at least some embodiments of the subject disclosure. The operational flow provides a method for querying an index. In at least some embodiments, one or more operations of the method are executed by a controller of an apparatus, such as the controller and apparatus shown in FIG. 8, which will be explained hereinafter.

At S660, the controller or a section thereof obtains target accuracy and target number of results. In at least some embodiments, the controller or the section thereof receives a target accuracy and a target number of results for the query provided by the client terminal 110. In some embodiments, in response to receiving the query, the metadata information containing the mathematical relationship is extracted according to the accuracy levels and required "topk" results.

At S662, the determining section determines a search depth parameter value. In at least some embodiments, the determining section determines a search depth parameter value based on a target accuracy and a target number of results based on the mathematical relationship. In at least some embodiments, the mathematical relationship expresses a correlation of search depth parameter, number of requested results, and accuracy.

At S664, the controller or a section thereof performs the query with the index. In at least some embodiments, the controller performs a query, according to the determined search depth parameter value, with the index having the fixed build parameter values. In at least some embodiments, the controller causes the database hosting the index to perform the query.

At S666, the controller or a section thereof transmits the result content of the query. In at least some embodiments, the controller transmits the result content of the query to the client terminal through the network. In at least some embodiments, the controller causes the database hosting the index to transmit the result content of the query to the client terminal.

Figure 7:
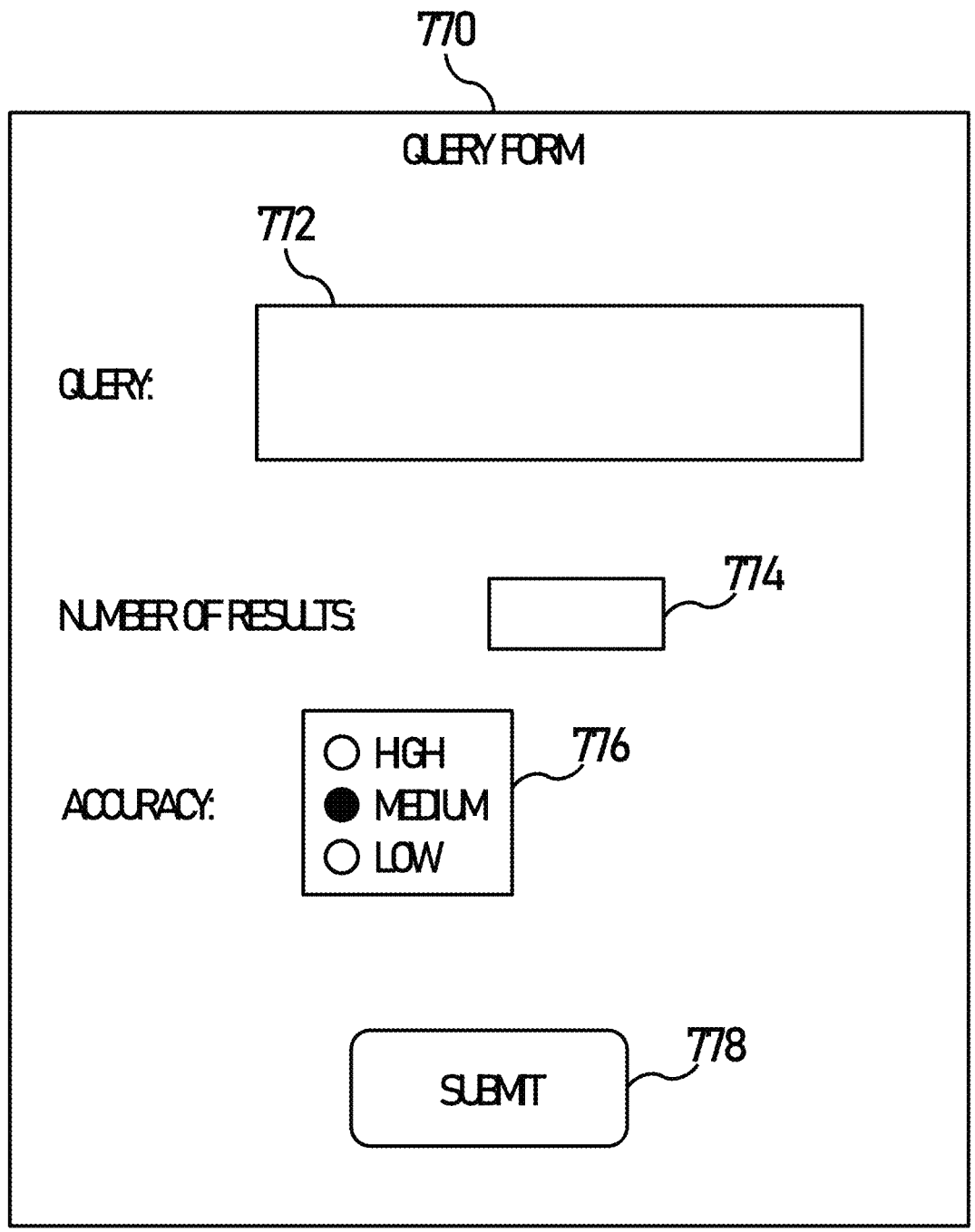
FIG. 7 is a user interface for a query form, according to at least some embodiments of the subject disclosure.

FIG. 7 is a user interface for a query form, according to at least some embodiments of the subject disclosure. In at least some embodiments, the user submits, through a client terminal, such as client terminal 110 of FIG. 1, a query by completing query form 770 and submitting the form to the apparatus through the network. Query form 770 includes text box 772, text box 774, checkbox 776, and submit button 778. In at least some embodiments, the user may enter a query in text box 772. In at least some embodiments, the user may enter a desired number of query results in text box 774. In at least some embodiments, the user may select a desired accuracy level of the query results in checkbox 776, e.g., high, medium and low. In at least some embodiments, the user submits the query request to the apparatus by clicking submit button 778 after the user completes query form 770.

Figure 8:
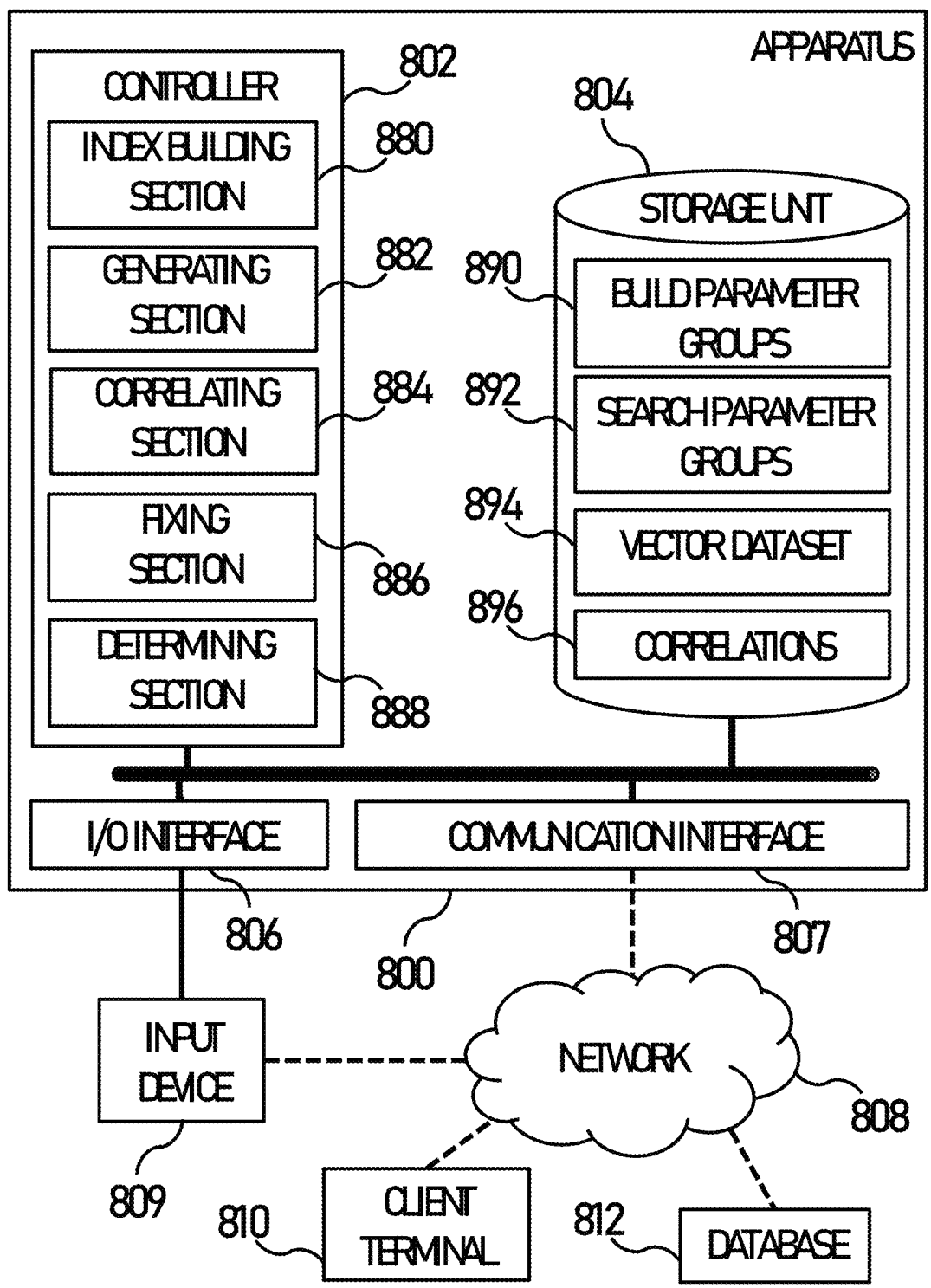
FIG. 8 is a block diagram of a hardware configuration for vector dataset index parameter determination, according to at least some embodiments of the subject disclosure.

FIG. 8 is a block diagram of a hardware configuration for vector dataset index parameter determination, according to at least some embodiments of the subject disclosure.

The exemplary hardware configuration includes apparatus 800, which interacts with input device 809, and communicates with input device 809 through network 808. In at least some embodiments, apparatus 800 is a computer or other computing device that receives input or commands from input device 809. In at least some embodiments, apparatus 800 is integrated with input device 809. In at least some embodiments, apparatus 800 receives query requests from client terminal 810 through network 808. In at least some embodiments, apparatus 800 retrieves vector data from database 812. In at least some embodiments, apparatus 800 is a computer system that executes computer-readable instructions to perform operations for vector dataset index parameter determination.

Apparatus 800 includes a controller 802, a storage unit 804, an input/output interface 806, and a communication interface 807. In at least some embodiments, controller 802 includes a processor or programmable circuitry executing instructions to cause the processor or programmable circuitry to perform operations according to the instructions. In at least some embodiments, controller 802 includes analog or digital programmable circuitry, or any combination thereof. In at least some embodiments, controller 802 includes physically separated storage or circuitry that interacts through communication. In at least some embodiments, storage unit 804 includes a non-volatile computer-readable medium capable of storing executable and non-executable data for access by controller 802 during execution of the instructions. Communication interface 807 transmits and receives data from network 808. Input/output interface 806 connects to various input and output units, such as input device 809, via a parallel port, a serial port, a keyboard port, a mouse port, a monitor port, and the like to accept commands and present information. In some embodiments, storage unit 804 is external from apparatus 800.

Controller 802 includes index building section 880, generating section 882, correlating section 884, fixing section 886, and determining section 888. Storage unit 804 includes build parameter groups 890, search parameter groups 892, vector dataset 894, and correlations 896.

Index building section 880 is the circuitry or instructions of controller 802 configured to build indexes with different parameters. In at least some embodiments, index building section 880 is configured to build an index of a vector dataset according to each build parameter group among a plurality of build parameter groups, each build parameter group including a plurality of candidate build parameter values. In at least some embodiments, index building section 880 utilizes information in storage unit 804, such as vector dataset 894, and records information in storage unit 804, such as build parameter groups 890. In at least some embodiments, index building section 880 includes sub-sections for performing additional functions, as described in the foregoing flow charts. In at least some embodiments, such sub-sections is referred to by a name associated with a corresponding function.

Generating section 882 is the circuitry or instructions of controller 802 configured to generate search parameter value groups. In at least some embodiments, generating section 882 is configured to generates search parameter groups, each search parameter group including a plurality of candidate search parameter values, wherein the plurality of candidate search parameter values includes a search depth parameter value and a number of requested results. In at least some embodiments, generating section 882 utilizes information in storage unit 804, such as feature vector dataset 894, and records information in storage unit 804, such as search parameter groups 892. In at least some embodiments, generating section 882 includes sub-sections for performing additional functions, as described in the foregoing flow charts. In at least some embodiments, such sub-sections is referred to by a name associated with a corresponding function.

Correlating section 884 is the circuitry or instructions of controller 802 configured to correlate parameters with accuracy and delay. In at least some embodiments, correlating section 884 is configured to correlate build parameter values and search parameter values with accuracy values and result delay values. In at least some embodiments, correlating section 884 updates information in storage unit 804, such as correlations 896. In at least some embodiments, correlating section 884 includes sub-sections for performing additional functions, as described in the foregoing flow charts. In at least some embodiments, such sub-sections is referred to by a name associated with a corresponding function.

Fixing section 886 is the circuitry or instructions of controller 802 configured to fix build parameters based on correlation. In at least some embodiments, fixing section 886 is configured to fixing build parameter values based on the correlations of build parameter values and search parameter values with accuracy values and result delay values. In at least some embodiments, fixing section 886 utilizes information from storage unit 804, such as correlations 896. In at least some embodiments, fixing section 886 includes sub-sections for performing additional functions, as described in the foregoing flow charts. In at least some embodiments, such sub-sections is referred to by a name associated with a corresponding function.

Determining section 888 is the circuitry or instructions of controller 802 configured to determine a mathematical relationship. In at least some embodiments, determining section 888 is configured to determine a mathematical relationship expressing a correlation of the search depth parameter values, the numbers of requested results, and the accuracy values obtained in response to vector queries submitted to the index having the fixed build parameter values. In at least some embodiments, determining section 888 utilizes information from storage unit 804, such as correlations 896. In at least some embodiments, determining section 888 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

According to at least some embodiments of the subject disclosure, vector dataset index parameter determination is performed by building an index of a vector dataset according to each build parameter group among a plurality of build parameter groups, each build parameter group including a plurality of candidate build parameter values, generating search parameter groups, each search parameter group including a plurality of candidate search parameter values, wherein the plurality of candidate search parameter values includes a search depth parameter value and a number of requested results, submitting each vector query in a vector query set to each index according to the candidate search parameter values from each search parameter group to obtain, for each vector query, a result content and a result delay value, wherein an accuracy value is determined based on the result content, correlating build parameter values and search parameter values with accuracy values and result delay values, fixing build parameter values based on the correlating; and determining a mathematical relationship expressing a correlation of the search depth parameter values, the numbers of requested results, and the accuracy values obtained in response to vector queries submitted to the index having the fixed build parameter values.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions executable by a processor to cause the processor to perform operations comprising:

building an index of a vector dataset according to each build parameter group among a plurality of build parameter groups, each build parameter group including a plurality of candidate build parameter values;

generating search parameter groups, each search parameter group including a plurality of candidate search parameter values, wherein the plurality of candidate search parameter values includes a search depth parameter value and a number of requested results;

submitting each vector query in a vector query set to each index according to the candidate search parameter values from each search parameter group to obtain, for each vector query, a result content and a result delay value, wherein an accuracy value is determined based on the result content;

correlating build parameter values and search parameter values with accuracy values and result delay values;

fixing build parameter values based on the correlating; and determining a mathematical relationship expressing a correlation of the search depth parameter values, the numbers of requested results, and the accuracy values obtained in response to vector queries submitted to the index having the fixed build parameter values.

2. The non-transitory computer-readable medium of claim 1, wherein the operations further comprise:
generating, after the fixing, additional search parameter groups based on the fixed build parameter values.

3. The non-transitory computer-readable medium of claim 1, wherein the operations further comprise:
recording, for each submission, the vector query and the search parameter values along with a result content and a result delay.

4. The non-transitory computer-readable medium of claim 1, wherein the operations further comprise:
sampling vectors among a vector dataset for use as the vector query set.

5. The non-transitory computer-readable medium of claim 1, wherein the operations further comprise:
determining the accuracy value based on ground truth.

6. The non-transitory computer-readable medium of claim 1, wherein the operations further comprise:
deploying the index for the vector dataset built according to the fixed build parameter values.

7. The non-transitory computer-readable medium of claim 1, wherein the operations further comprise:
determining a search depth parameter value based on a target accuracy and a target number of results based on the mathematical relationship;
performing a query, according to the determined search depth parameter value, with the index having the fixed build parameter values; and
transmitting a result content of the query.

8. The non-transitory computer-readable medium of claim 1, wherein the operations further comprise:
determining the plurality of candidate build parameter values of each build parameter group based on an index type.

9. A method comprising:
building an index of a vector dataset according to each build parameter group among a plurality of build parameter groups, each build parameter group including a plurality of candidate build parameter values;
generating search parameter groups, each search parameter group including a plurality of candidate search parameter values, wherein the plurality of candidate search parameter values includes a search depth parameter value and a number of requested results;
submitting each vector query in a vector query set to each index according to the candidate search parameter values from each search parameter group to obtain, for each vector query, a result content and a result delay value, wherein an accuracy value is determined based on the result content;
correlating build parameter values and search parameter values with accuracy values and result delay values;
fixing build parameter values based on the correlating; and
determining a mathematical relationship expressing a correlation of the search depth parameter values, the numbers of requested results, and the accuracy values obtained in response to vector queries submitted to the index having the fixed build parameter values.

10. The method of claim 9, further comprising:
generating, after the fixing, additional search parameter groups based on the fixed build parameter values.

11. The method of claim 9, further comprising:
recording, for each submission, the vector query and the search parameter values along with a result content and a result delay.

12. The method of claim 9, further comprising:
sampling vectors among a vector dataset for use as the vector query set.

13. The method of claim 9, further comprising:
determining the accuracy value based on ground truth.

14. The method of claim 9, further comprising:
deploying the index for the vector dataset built according to the fixed build parameter values.

15. The method of claim 9, further comprising:
determining a search depth parameter value based on a target accuracy and a target number of results based on the mathematical relationship;
performing a query, according to the determined search depth parameter value, with the index having the fixed build parameter values; and
transmitting a result content of the query.

16. The method of claim 9, further comprising:
determining the plurality of candidate build parameter values of each build parameter group based on an index type.

17. An apparatus comprising:
a controller including circuitry configured to:
build an index of a vector dataset according to each build parameter group among a plurality of build parameter groups, each build parameter group including a plurality of candidate build parameter values;
generate search parameter groups, each search parameter group including a plurality of candidate search parameter values, wherein the plurality of candidate search parameter values includes a search depth parameter value and a number of requested results;
submit each vector query in a vector query set to each index according to the candidate search parameter values from each search parameter group to obtain, for each vector query, a result content and a result delay value, wherein an accuracy value is determined based on the result content;
correlate build parameter values and search parameter values with accuracy values and result delay values;
fix build parameter values based on the correlating; and
determine a mathematical relationship expressing a correlation of the search depth parameter values, the numbers of requested results, and the accuracy values obtained in response to vector queries submitted to the index having the fixed build parameter values.

18. The apparatus of claim 17, wherein the circuitry is further configured to:
generate, after the fixing, additional search parameter groups based on the fixed build parameter values.

19. The apparatus of claim 17, wherein the circuitry is further configured to:
record, for each submission, the vector query and the search parameter values along with a result content and a result delay.

20. The apparatus of claim 17, wherein the circuitry is further configured to:
sample vectors among a vector dataset for use as the vector query set.

* * * * *